Nov. 22, 1949  J. J. ROOT  2,489,049
TEMPERATURE CONTROL
Filed Dec. 20, 1945
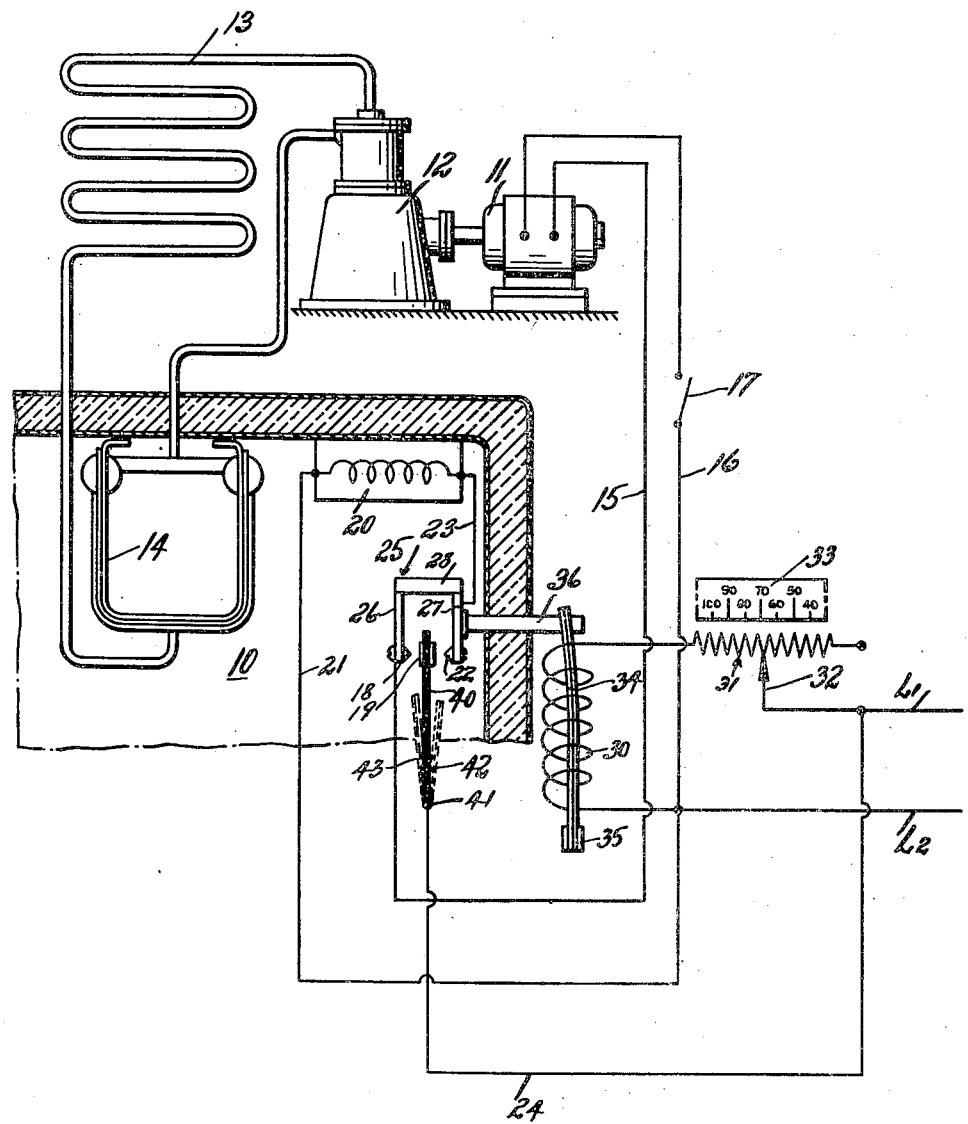
INVENTOR.
John J. Root
BY
S. Stephen Baker Patented Nov. 22, 1949

2,489,049

UNITED STATES PATENT OFFICE 2,489,049

TEMPERATURE CONTROL

John J. Root, New York, N. Y.

Application December 20, 1945, Serial No. 636,123

3 Claims. (Cl. 257—3)

This invention relates to a temperature controlling device and more particularly to a device for controlling the actuation of either a heat or cold producing unit in a system incorporating both such units or in a system employing one of them.

The control of electrically actuated refrigerating or heating systems generally involves the actuation of the cold or heat producing components as governed by the temperature desired and that attained through their actuation. Thus, for example, the cold produced by a refrigerating system may react upon a thermal responsive element which has been so adjusted or constructed as to respond to a particular temperature. Such response may then cut off the actuation of the cold producing component. Controls for determining the temperature at which such actuation is cut off are usually located at the site of the apparatus. The present invention, however, is directed in part to a temperature control which can be conveniently and efficiently operated remotely of the apparatus and which can control the operation of a refrigerating or heating unit with precision.

It is an object of this invention further to provide a temperature control for systems incorporating both heat and cold producing units wherein these units contribute to the production of a desired temperature. The instant invention provides a means for controlling the actuation of these units selectively according to a disparity in the temperature desired and that prevailing in the area served by the system.

Another object of this invention is to provide a thermal responsive element in an area or zone served by a temperature regulating system wherein the responsiveness of the element is varied according to the temperature desired. Thus, means are provided to vary the sensitivity of the thermal responsive element in regard to either heat or cold so that the element does not activate or de-activate a temperature regulating component until a preset degree of said heat or cold has been exceeded in the zone wherein said element is disposed. Allied with this object is the provision of such sensitivity varying means effectively located at a convenient distance from the zone under control so that remote temperature control thereof is provided.

Another object of this invention is to produce a temperature control in which the regulation is effective over an extremely wide range in that a thermal responsive element for activating or de-activating temperature regulating components may be biased through electrical means so as to vary its thermal response.

Another object of this invention is to provide a thermal responsive element which is adjusted so as to move in one direction by the application of heat and in another direction by the application of cold, but wherein means are provided to produce either of these reactions from a normal position of the element without requiring the application of cold.

Other objects of my invention will be apparent from the following description, it being understood that the above general statements of the objects of my invention are intended to describe and not to limit it in any manner.

Referring to the drawing, the figure illustrates a diagrammatic view of a temperature controlling device constructed according to the present invention.

The apparatus is illustrated as applied to an insulated enclosure 10 which may take the form of a refrigerator, a room, a compartment, or any zone or area wherein the temperature is to be regulated. Both a refrigerating and a heating system are illustrated as contributing to the desired temperature, although the invention may be employed with only one of these components. The operation of the refrigerating apparatus per se is conventional, the motor 11 driving a compressor 12 so that the refrigerant contained in the condenser 13 is compressed thereby and is condensed at high pressure in the condenser 13 and conveyed to an evaporator 14. The apparatus operates on the conventional compressor-condenser-expander cycle as is apparent to those skilled in the art.

According to the invention herein, control of the compressor 12 is provided by applying or cutting off electrical current to the motor 11. The apparatus, therefore, controls the connection of electrical lines L1 and L2 to the motor 11 through wires 15 and 16. A switch 17 in the motor circuit is included so that the motor 11 can be de-energized apart from the control to be hereinafter described. Motor 11 completes its electrical circuit through switch contacts 18 and 19 which are movable relative to each other through the controls which regulate the operation of the motor.

Disposed also within the area under control is a heater 20 which may take the form of a conventional heating coil of large capacity or an infrared radiation device. The refrigerating system or the heating system is adapted to operate selectively and whereas they are illustrated as being disposed adjacent to each other, either may be disposed in any desirable location in the area. Either the refrigerating or the heating component is actuated selectively by the temperature controlling device of this invention.

The heater 20 is connected by wire 21 to the current line L2 and makes electrical connection to switch contact 22 through the wire 23. Switch contact 19 is electrically connected through wire 24 to current line L1 so that it will be understood that when contacts 18 and 19 meet, motor 11 is energized, whereas if contacts 19 and 22 meet, motor 20 is energized.

Means for controlling the selective meeting of the respective contact members is provided in the form of a U-shaped member 25 having arms 26 and 27 of electrically conductive material and a bridging portion 28 of insulating material. U-shaped member 25 is arranged for reciprocating movement in respect to contact 19 by the control mechanism to be hereinafter described.

Current lines L1 and L2 serve to energize a control heating coil 30 through a rheostat 31 having a movable arm 32 connected to the line L1. Indicia 33 disposed in juxtaposition to the rheostat 31 serves to guide the setting of the movable arm in accordance with the temperature desired in the zone 10. Thermally associated with heater coil 30, as by being enclosed within its turns, is the bimetal 34 which may be secured to any supporting member at 35. Connected to the free end of bimetal 34 is arm 36 which is in turn connected to the U-shaped member 25. Arm 36 is slidable within the enclosing walls of zone 10 so that the U-shaped member 25 may be laterally actuated in accordance with the movements of bimetal 34. In the construction illustrated and as viewed in the figure of the drawing herein, bimetal 34 is adapted to respond to an increase in heating voltage by bending to the left so that U-shaped member 25 is similarly displaced. It will be apparent, therefore, that the application of cold or its equivalent, to bimetal 34 will cause a reverse movement thereof and a corresponding movement of U-shaped member 25.

Contact element 19 is disposed on both sides of bimetal 40 which is mounted at 41 and disposed in the zone 10 so as to be influenced by the temperature prevailing therein.

My invention is practiced as follows:

It is generally desired, but not necessary, that bimetal 34 be maintained in a normal position wherein it is under the influence of the heating coil 30 to a limited degree so that it is initially leftwardly biased as illustrated in Fig. 1. It is to be understood, however, that this is merely a suggested method of procedure and is not intended to be a limitation of the invention. Rheostat 31 may conveniently be located at any desirable distance from zone 10 since its connection to the controlling apparatus is through electrical conductors.

In order to raise the temperature of zone 10, the operator may adjust the movable arm 32 to a higher portion of the indicia scale 33. This will increase the heating effect of coil 30, and bimetal 34 together with the arm 36, will move the U-shaped member 25 so that contact members 19 and 22 will meet. The heater 20 will thereupon be energized so as to supply the desired heat to zone 10. When the heat has reached a degree sufficient to produce a reaction in bimetal 40, that bimetal will bend leftwardly so as to open the electrical circuit of heater 20. It will be understood that through the actuation of bimetal 34 which, according to its action, may be considered a motor element, the bimetal 40 is sprung to an extent dictated by the energizing of coil 30. The greater the pressure that is exerted against bimetal 40 by U-shaped member 25, the more will it be physically bent or sprung so that its response to the temperature of zone 10 is varied accordingly. Thus, the system provides a means for physically altering the response characteristics of bimetal 40 so that it will not open an electrical circuit of which it is an element until the heat produced is sufficient to produce a sufficient response in the bimetal as adjusted by the U-shaped member 25. Assuming, therefore, that the bimetal 40 has been physically bent to an extreme leftward position through the action of the controlled bimetal 34, a high degree of heat will be necessary to influence it to a condition of disassociation from the contact member 22.

If, on the other hand, should it be desired to lower the temperature of zone 10, rheostat arm 32 will be moved in a reverse direction so as to lower the voltage on coil 30 and thus urging bimetal 34 toward the right, as viewed in the figure. Contact 18 will thereupon be caused to meet contact 19 so as to energize motor 11 and cool the zone 10 by virtue of the refrigerating system illustrated. Short dash lines 42 illustrate the sprung position of bimetal 40 effected by such meeting between contacts 18 and 19 while the longer dash lines 43 illustrate its sprung position in response to reverse actuation thereof.

After the refrigerating system has been in operation for a length of time sufficient to cool the area to the desired degree, bimetal 40 will bend to the right from its sprung position, further than the dash lines 42. This will interrupt the electrical current to motor 11 and discontinue the operation of the refrigerating system.

I have shown a preferred embodiment of my invention but it is obvious that numerous changes and omissions may be made without departure from its spirit. For example, while I have described the apparatus as being applied to the temperature control of a zone or region, it can be utilized in any environment where the operation of an apparatus is dependent upon particular temperature conditions.

I claim:

1. In a temperature regulating apparatus comprising two electrically actuated components for maintaining a desired temperature in a zone, an operating control for said apparatus, said control comprising a first bimetal thermostat, means to apply a controllable degree of heat to said first bimetal thermostat so as to produce a controlled movement thereof, a U-shaped member including a pair of spaced and mutually insulated switch elements connected to said first bimetal thermostat so as to be movable thereby, each of said switch elements being respectively formed on one of the outer arms of the U-shaped member and being included in the respective electrical circuits of each of said components, a second bimetal thermostat disposed between said spaced switch elements whereby the movement of said switch elements produces contact between one of said switch elements and the said second bimetal thermostat, said second bimetal thermostat being included in the electrical circuit of both of said components and being disposed in the zone served by said apparatus, the closing of the electrical circuit of either of said components being operative to produce a temperature in said zone which reacts upon said second bimetal thermostat to move it out of contact with a switch element when the temperature of said zone has reached a desired level.

2. In a temperature regulating apparatus comprising a heat producing component and a cold producing component for maintaining a desired temperature in a zone, an operating control for said apparatus, said control comprising a first bimetal thermostat, an electrical heater coil in operative relation to said first bimetal thermostat, a remotely disposed variable voltage source for said heater coil so as to produce movements of said first bimetal thermostat in accordance with voltage variations applied to said heater coil, an arm connected to said first bimetal thermostat, a U-shaped member connected at the end of said arm, a pair of spaced switch elements carried by the respective outer arms of said U-shaped member and disposed in the zone served by said apparatus, one of said switch elements being included in the electrical circuit of said heat producing component and the other switch element being included in the electrical circuit of said cold producing component, said pair of spaced switch elements being bodily shiftable in response to the voltage variations applied to said heater coil, a second bimetal thermostat disposed in the zone served by said apparatus and bendably mounted for movement between said spaced switch elements, said second bimetal thermostat being included in the electrical circuits of both said heat and cold producing components and being operative to close the electrical circuit of either of said components upon contact with the switch element included in its electrical circuit so as to produce either heat or cold in said zone, the movement bodily of said spaced switch elements being operative to close the circuit of either of one of said components, the temperature change in the zone resulting therefrom being operative to influence said second bimetal thermostat to withdraw from contact with said switch element so as to re-open said closed circuit when the temperature of said zone has reached a desired level.

3. An operating control according to claim 2 wherein said variable voltage source for said heater coil comprises electrical conductors for applying a voltage to said heater coil and a rheostat in one of said conductors, said rheostat being disposed remotely from said zone and indicia associated with said rheostat for indicating settings thereof.

JOHN J. ROOT.

REFERENCES CITED

The following references are of record in the file of this patent:

UNITED STATES PATENTS

| Number | Name | Date |
|---|---|---|
| 2,129,477 | Parks | Sept. 6, 1938 |
| 2,288,843 | Roland | July 7, 1942 |

FOREIGN PATENTS

| Number | Country | Date |
|---|---|---|
| 541,830 | Great Britain | Acc. Dec. 12, 1941 |